3,651,155
HIGH DENSITY FLUIDS

Richard Garth Pews and Ralph A. Davis, Midland, Mich., assignors to The Dow Chemical Company, Midland, Mich.
No Drawing. Filed Mar. 13, 1969, Ser. No. 807,123
Int. Cl. C07c 23/08, 23/10
U.S. Cl. 260—648 F       7 Claims

ABSTRACT OF THE DISCLOSURE

The present invention is a group of fluorobromocycloalkanes characterized by the formula:

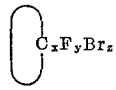

wherein $x$ is 5 or 6, $z$ is 3 or 4 when $x$ is 6 and 2 or 3 when $x$ is 5 and the ratio of $(y+z)$ to $x$ is 2:1.

Also provided is a process for preparing the compounds as defined above.

BACKGROUND OF THE INVENTION

Perhalocyclohexanes are known. McBee et al., report in vol. 39, Industrial and Engineering Chemistry, 378–380 that hexachlorobenzene may be fluorinated with bromine trifluoride to yield bromochlorofluorocyclohexanes. This reference reports the preparation of a mixture of compounds having the average molecular formula $C_6Br_2Cl_4F_6$.

Fluorobromocyclohexanes are also known. Evans and Tatlow report in 1954 Journal of the Chemical Society 3779 that certain isomers of octafluorotetrabromocyclohexane were prepared by brominating 1,4 octafluorocyclohexadiene with bromine in the presence of ultraviolet light. By this process, 1,2,4,5-tetrabromooctafluorocyclohexane and 1,2,3,4-tetrabromooctafluorocyclohexane were prepared. The 1,2,4,5-isomer was reported to have a B.P. of 99° at 2 mm. Hg and a melting point of from 40–42° C. The 1,2,3,4-isomer was reported to have a boiling point of 105° C. at 20 mm. Hg and a melting point of from 42–43° C.

Unexpectedly, it was discovered that by preparing a mixture of isomers of octafluorotetrabromocyclohexane the resulting composition was a liquid rather than solid at room temperature. The liquid isomeric mixture exhibits high density due to its cyclic structure and its bromine content and low viscosity due to the fluorine content. Unexpectedly, the composition also exhibits excellent thermal stability at temperatures as high as 285° F. These properties together with the liquid physical state of the present composition at temperatures below 10° C. make it especially useful as high a density fluid for use in gyroscopes. The isomeric mixtures of the other compounds of the present invention; i.e. nonafluorotribromocyclohexane, heptafluorotribromocyclopentane and octafluorodibromocyclopentane, are also dense liquids and are useful as high density fluids. These compounds require no viscosity or density improvers, inhibitors or stabilizers for use as gyroscope fluids.

The compositions of the present invention also find utility as fire retardants. By mixing the compositions with certain plastics the ability of the treated material to burn is reduced.

SUMMARY OF THE INVENTION

The present invention is an isomeric mixture of fluorobromocycloalkanes characterized by the formula:

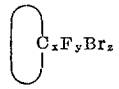

The cycloalkane is either cyclopentane or cyclohexane, i.e. $x$ is 5 or 6, $z$ is 3 or 4 when $x$ is 6 and 2 or 3 when $x$ is 5 and the ratio of $(y+z)$ to $x$ is 2:1.

The compositions are prepared by reacting hexabromocyclopentandiene or hexabromobenzene with a polyfluoro halogen.

DESCRIPTION OF PREFERRED EMBODIMENTS

The isomeric mixtures of octafluorotetrabromocyclohexane and heptafluorotribromocyclopentane are preferred over nonafluorotribromocyclohexane and octafluorotetrabromocyclopentane for use as high density fluids. These preferred embodiments are more dense than the less highly brominated compounds and remain liquids of low viscosity at relatively low temperatures.

The compounds of the present invention are prepared by fluorinating hexabromobenzene or hexabromocyclopentadiene with a polyfluorohalogen. Known polyfluorohalogens include chlorine trifluoride, bromine trifluoride, iodine pentafluoride and iodine heptafluoride. When iodine pentafluoride or iodine heptafluoride is the fluorinating agent, the reactants may be directly reacted. Bromine trifluoride and chlorine trifluoride are preferred fluorinating agents and when they are used, the reaction is normally carried out in a solvent. Direct contact of such reactants results in a rapid reaction which becomes violent unless caution is used in bringing the reactants together. The use of a solvent such as bromine or a fluorocarbon oil permits the reaction to go smoothly. Bromine is the preferred solvent.

When the fluorinating agent is bromine trifluoride or chlorine trifluoride and the reaction is carried out in a bromine solvent, the temperature should be maintained within the range of from about −10 to 60° C. with a temperature range of from 15 to 50° C. being preferred. The pressure at which the reaction is run is not critical; atmospheric is preferred.

The ratio of reactants is not critical, however, when octafluorotetrabromocyclohexane is the desired product, the molar ratio of hexabromobenzene to halogentrifluoride should be less than about 1:3 for maximum conversion to the desired product. When heptafluorotribromocyclopentane is the desired product, the molar ratio of hexabromocyclopentadiene to halogentrifluoride should not be less than about 1:3.5 for maximum conversion.

The following examples will serve to further illustrate the invention.

Example 1

One mole, 552 gm., of hexabromobenzene and 300 ml. of $Br_2$ were charged to a 3 liter, 3 neck Monel flask equipped with a nickel dropping funnel. The mixture was stirred until the hexabromobenzene was in solution and the flask cooled in ice water. A mixture of bromine and bromine trifluoride, 420 gm. of bromine and 420 gm. (3.0 mole) of bromine trifluoride, was added dropwise over a period of 1 hour and 15 minutes. The condenser was cooled with 15° C. tap water during the addition of the bromine/bromine trifluoride mixture. After addition of the bromine trifluoride, the mixture was allowed to warm to room temperature and stirred for an additional two hours. The resulting mixture was then poured onto crushed ice and the free bromine removed by washing with a cold aqueous $NaHSO_3$ solution. The recovered liquid was washed with warm water and separated into two liquid phases.

The crude product which was a colorless liquid was dried with $Na_2SO_4$, charged to a semi micro vigreaux flask and separated by distillation.

The principal material recovered was a mixture of isomers of octafluorotetrabromocyclohexane having a boiling range of from 64° to 70° C. at 0.5 mm. The amount of $C_6Br_4F_8$ recovered was 35.5 gm. (0.646 M). This was a 64.6% conversion and a yield of 75.6%. The organic recovery was 83%.

The liquid product thus prepared was found to have a density of 2.6265 gm./cc. at 25° C. Upon cooling the composition was found to increase in viscosity markedly at about 10° C. Upon cooling to −40° C. the composition became very viscous. At −55° C. to −60° C. the composition was a glass like semi-solid.

The results of elemental analysis are as follows:

Theory for $C_6Br_4F_8$ (percent): C, 13.26; H, —; Br, 58.79; F, 27.96. Found (percent): C, 13.60; H, 0.15; Br, 60.20; F, 26.0.

By organic recovery is meant the weight ratio of product recovered to the organic reactants; and by percent yield is meant the weight ratio of product to the amount of starting organic material which entered into the reaction. Percent conversion is based on hexabromobenzene as the limiting substance.

The head cut and cold trap material appeared to be essentially nonafluorotribromocyclohexane which had a boiling range of 30 to 60° C. at 0.5 mm. The composition was confirmed by vapor phase chromatography.

Example II

Hexabromocyclopentadiene (125 gm.–0.138 M.), and 100 ml. $Br_2$ were placed in a 1 liter Monel 3-necked flask and cooled in an ice bath. Bromine trifluoride (90 gm.–0.65 M.) was added over a period of 90 minutes. After addition of the bromine trifluoride, the mixture was allowed to warm to room temperature and stirred for an additional hour. The contents of the flask were then poured onto crushed ice and the bromine removed by reacting with cold, aqueous $NaHSO_3$. The liquid organic product was separated by phase separation and distilled. The distillation yielded 45 gm. of a liquid material having a B.P. of ∼70° at 30 mm. Hg. This material was found to be heptafluorotribromocyclopentane by mass spectral analysis. The composition was found to have a melting range of from −10° to −7° C.

In a manner similar to the above preparation, octafluorodibromocyclopentane is prepared by employing a greater excess of fluorinating agent, such as for example, a molar ratio of bromine or chlorine trifluoride to hexabromopentadiene of about 6 to 1.

Example III

Nineteen grams of linear polyethylene molding powder and 1.0 gram (5.0%, 2.9% Br) of octafluorotetrabromocyclohexane were thoroughly mixed. The mixture was then molded into a sheet of ∼10 to 15 mils thick and ⅜″ by 1 inch strips were cut from this material.

Sample strips of each composition were then placed in a vertical position and the upper ends ignited with a match. The results of these experiments are as follows:

| Material | Burning time |
|---|---|
| 1. Linear polyethylene | Sample continued to burn until strip was consumed. |
| 2. Linear polyethylene with 5% $C_6Br_4F_8$. | 30-40 sec., samples difficult to ignite. |

Example IV

The octafluorotetrabromocyclohexane of Example 1 was evaluated for its thermal stability in the following manner:

A 3 ml. sample of the material was loaded into a polymer tube which was then flushed with helium 4 times, back filled with helium to a pressure of 700 mm. of Hg and sealed. The tube was then suspended in an oil bath at a temperature of 140.55° C. (285° F.) for 11 days. The results of this test are as follows:

| Condition of sample | |
|---|---|
| Number of days:[1] | |
| 1 | No change. |
| 2 | Do. |
| 4 | Very slight discoloration (brown in color) some evidence of low boilers on walls of tube. |
| 5 | Do. |
| 6 | Do. |
| 7 | Do. |
| 8 | Do. |
| 9 | Do. |
| 11 | Sample slightly discolored (brown) and has evidence of low boilers. There were no solids in sample and no apparent black ring at interface of the liquid and gas phases. |

[1] At 285° F.

The density of the sample was measured and the composition was determined by elemental analysis before and after heating. The results are as follows:

ANALYSIS OF SAMPLE

| | Theory | Before thermal test | After thermal test |
|---|---|---|---|
| Percent: | | | |
| C | 13.26 | 13.60 | 13.50 |
| H | 0.00 | 0.15 | |
| Br | 58.79 | 60.20 | 60.20 |
| F | 27.96 | 26.00 | 26.20 |
| Density at 22° C., gm./cc | | 2.6156 | 2.6168 |

The absence of a black ring is believed to indicate that the composition did not decompose into bromine and other decomposition products. When such decomposition occurs, a black ring of NaBr occurs on the glass surface.

The "low boilers" were apparently hydrocarbon impurities which were removed by the heating process.

We claim:
1. Fluorobromocycloalkanes in isomeric mixture characterized by the formula:

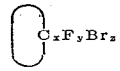

wherein $x$ is 5 or 6, $z$ is 3 or 4 and $y$ is 8 or 9 when $x$ is 6, $z$ is 2 or 3 and $y$ is 7 or 8 when $x$ is 5 and the ratio of $(y+z)$ to $x$ is 2:1 said fluorobromocycloalkanes being further characterized in that they are dense liquids at room temperature and are prepared by reacting hexabromocyclopentadiene or hexabromobenzene with bromine trifluoride, chlorine trifluoride, iodine pentafluoride or iodine heptafluoride with the reaction being carried out in bromine when bromine trifluoride or chlorine trifluoride is employed as fluorinating agent.

2. The fluorobromocycloalkanes of claim 1 wherein $x$ is 6, $z$ is 4 and $y$ is 8.

3. The fluorobromocycloalkanes of claim 1 wherein $x$ is 5, $z$ is 3 and $y$ is 7.

4. The fluorobromocycloalkane of claim 2 prepared by reacting hexabromocyclopentadiene with bromine trifluoride at a temperature within the range of from −10° to 60° C.

5. The fluorobromocycloalkane of claim 3 prepared by reacting hexabromobenzene with bromine trifluoride at a temperature within the range of from −10° to 60° C.

6. The fluorobromocycloalkanes of claim 1 prepared by carrying out the reaction at a temperature within the range of from −10° to 60° C.

7. The fluorobromocycloalkanes prepared by the process of claim 6 wherein the fluorinating agent is chlorine trifluoride.

References Cited

UNITED STATES PATENTS 2,489,969  11/1949  McBee et al. _____ 260—648 F

OTHER REFERENCES

Evans et al., J. Chem. Soc., 1954, pp. 3779–3781.
Stacey et al., Advances in Fluorine Chemistry, vol. 1, pp. 3 and 10 (1960).

DANIEL D. HORWITZ, Primary Examiner

U.S. Cl. X.R.

74—5; 106—15; 252—8.1; 260—45.7